United States Patent [19]
Buchtel et al.

[11] 3,719,308
[45] March 6, 1973

[54] DENTAL DRINKING CUP FILLING APPARATUS

[75] Inventors: Dean H. Buchtel, Kenneth R. Lappin, John A. Maurer, all of Canton, Ohio

[73] Assignee: The Weber Dental Manufacturing Company, Canton, Ohio

[22] Filed: Oct. 26, 1970

[21] Appl. No.: 83,897

[52] U.S. Cl.................222/70, 137/613, 222/146 H
[51] Int. Cl.............................B67d 5/34, B67d 5/62
[58] Field of Search..222/70, 146 R, 146 H, 146 HE, 222/133, 144.5, 129.3, 76; 137/334, 337, 341, 599, 613, 624.11

[56] References Cited

UNITED STATES PATENTS

| | | | |
|---|---|---|---|
| 2,712,887 | 7/1955 | King | 222/76 X |
| 2,961,127 | 11/1960 | Reynolds et al. | 222/70 |
| 3,216,623 | 11/1965 | Grundmann | 222/146 HE |
| 3,536,097 | 10/1970 | Caparone et al. | 137/337 X |

*Primary Examiner*—Samuel F. Coleman
*Assistant Examiner*—Francis J. Bartuska
*Attorney*—Frease & Bishop

[57] ABSTRACT

A filling apparatus for a drinking cup for a dental unit which enables the cup to be filled automatically with a desired predetermined amount of cold water by pressing a control button. Hot water may be mixed with the cold water to temper the cold water during the automatic filling by pressing a second hot water button and holding the same for the time necessary to add and mix the desired amount of hot water. Alternately, the hot water button may be pressed to discharge a desired amount of hot water only into the cup.

1 Claim, 2 Drawing Figures

PATENTED MAR 6 1973 3,719,308

INVENTORS
DEAN H. BUCHTEL,
KENNETH R. LAPPIN,
and JOHN A. MAURER

BY *Frease & Bishop*
ATTORNEY 3,719,308

DENTAL DRINKING CUP FILLING APPARATUS

BACKGROUND IF THE INVENTION

1. Field of the Invention

The invention relates to drinking cup facilities for a patient in a dentist's or doctor's office; and more particularly to equipment for filling the cup with a measured amount of cold water or a mixture of hot and cold water automatically upon actuating feed water control means, and alternately for filling the cup with a desired amount of warm or hot water.

2. Description of the Prior Art

Dental unit drinking cup facilities with manual valve control for the water have been used for years. More complicated cup filling equipment has been used which is actuated by placing a cup on a platform so that the weight of the cup and water filling the cup, or a predetermined time control of water flow actuated by placing the cup on the platform, determines the amount of water discharged into the cup. Other weighing devices for flow control also have been used. Such prior automatic cup filling equipment, however, has involved delicate mechanical and electrical components difficult to maintain in adjustment and requiring frequent servicing by technically-trained personnel.

Moreover, prior dental cup filling devices do not provide for selective hot and cold water filling of the cup, or for mixing hot into cold water when automatically filling the cup with cold water; and do not provide for such operations with very simple, uncomplicated components avoiding requirements of frequency or delicate adjustments or servicing.

SUMMARY OF THE INVENTION

Objectives of the invention include providing dental unit drinking cup filling equipment with suitable water supply and control devices to discharge either hot or cold water or both into a cup; providing filling equipment which delivers a measured amount of cold water automatically to the cup upon actuating a first control button; providing filling equipment which mixes hot water into the measured amount of cold water during delivery thereof to the cup upon actuating a second control button; providing equipment for alternatively delivering a desired quantity of hot water to the cup; and providing dental unit drinking cup filling equipment which satisfies the stated objectives using components of simple design which do not require careful or frequent adjustment and which avoid difficulties heretofore encountered in a simple, effective, and inexpensive manner, thereby satisfying existing needs in the art.

These objectives and advantages are obtained by the construction, the general nature of which may be stated as including a main water supply, manual shutoff valve means for the main water supply; solenoid actuated main water supply valve means, control means for actuating the main solenoid valve means preferably located at a first station; filter and pressure regulator means for water delivered from the main water supply; a cold water outlet line connected with the pressure regulator, water heater means, a first junction in the cold water outlet line; a branch line connecting the first junction with the water heater; a second junction in the cold water outlet line, solenoid operated cold water control valve means in the cold water outlet line between the first and second junctions; a hot water outlet line for the water heater means connected with the second junction, solenoid operated hot water control valve means in the hot water line between the heater means and second junction; cup support means, filler spout means adjacent the cup support connected to the cold water outlet line, metering valve means in said cold water outlet line between the spout means and second junction preferably located at said first station; heater control means preferably located at said first station; the cold water control valve means including an actuating button preferably located at said first station, and the hot water control valve means including an actuating button preferably located at a second station.

BRIEF DESCRIPTION OF THE DRAWING

A preferred embodiment of the invention — illustrative of the best mode in which applicants have contemplated applying the principles — is set forth in the following description and shown in the drawing and is particularly and distinctly pointed out and set forth in the appended claims.

Similar numerals refer to similar parts throughout the drawing.

DESCRIPTION OF THE PREFERRED EMBODIMENT

Figure 1:
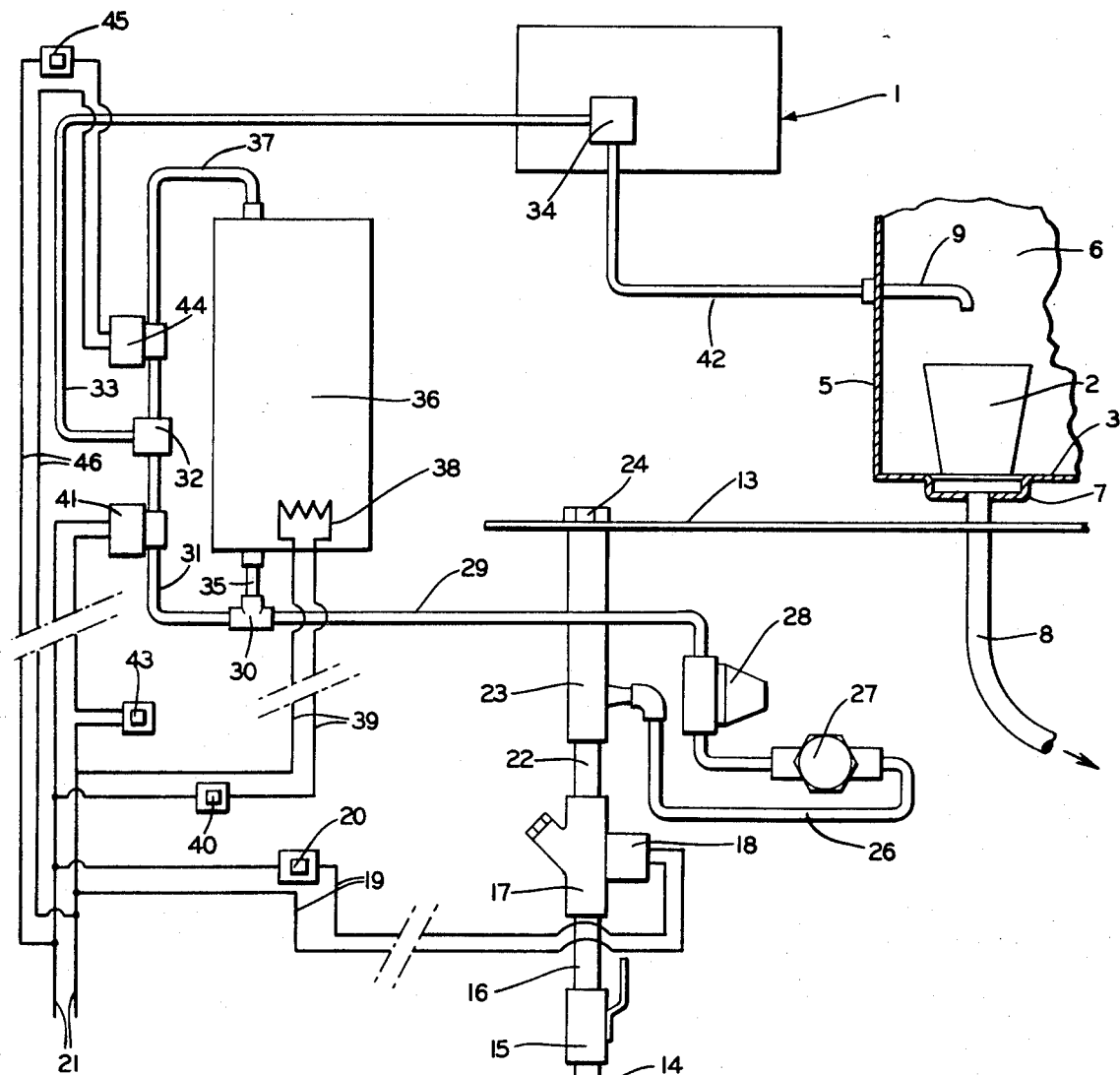
FIG. 1 is a diagrammatic perspective view illustrating a dental cabinet or unit in which the improved cup filling apparatus may be housed.
Figure 2:
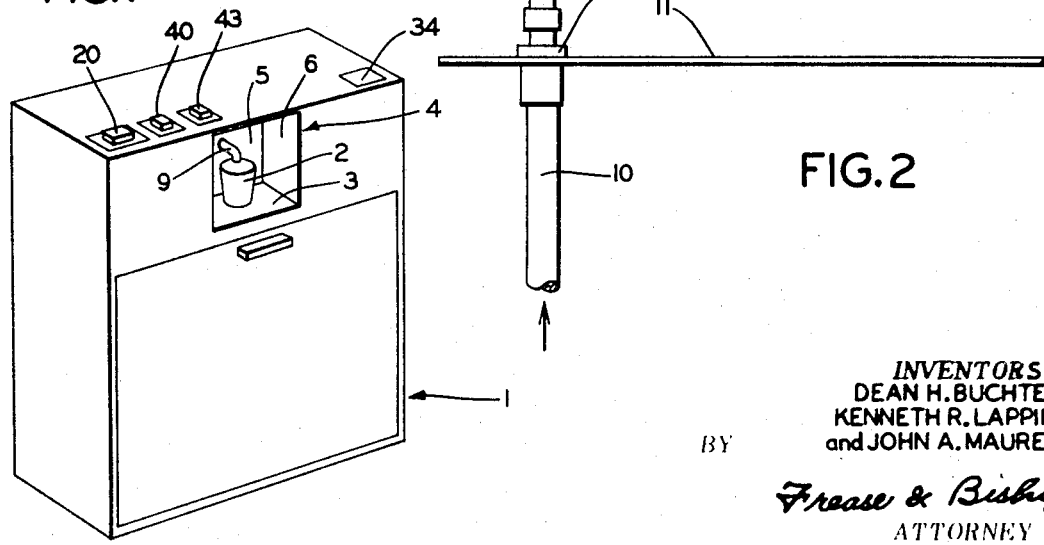
FIG. 2 is a diagrammatic view illustrating piping connections, components and electrical control lines provided for the improved cup filling apparatus.

The invention is shown typically in the drawing incorporated in the diagrammatically illustrated dental cabinet or unit 1. The cabinet 1 may have any desired size, may house other dental appliances or accessories, may be mounted on a wall or on a floor, and may have suitable plumbing connections for a main water supply and drain or waste facilities. Cabinet 1 is located conveniently to a dental chair within easy reach of a patient resting, sitting, or reclining on a chair; and cabinet 1 also is located to be readily accessible to the dentist or his assistant.

In accordance with the invention, a drinking cup 2 may rest on the support member 3 which may be recessed in the unit 1 as generally indicated at 4, and the recess 4 may have a rear wall 5 and side walls 6. The support member 3 for cup 2 may have any suitable grill or formation providing fluid drainage to a drain outlet 7 connected with any suitable drain or waste hose 8 which in turn may be connected to a plumbing waste pipe. A spout 9 may extend through the recess wall 5 to discharge water into drinking cup 2.

A main water supply pipe 10 for water for the drinking cup and for accessories with which the dental unit 1 may be equipped may extend through a partition support member 11, and is supported thereon by flange 12. Support member 11 is mounted in any suitable manner within cabinet 1 near the bottom thereof. One other support member 13 also may be mounted within cabinet 1 spaced above member 11.

Water in main supply pipe 10 then flows through the pipe section 14 to manual water shutoff valve 15. Valve 15 preferably is provided so as to permit repairs to any water lines beyond valve 15 and also to provide a cutoff in case of power failure which might affect the operation of solenoid operated valves or other components of apparatus housed in cabinet 1. A conduit 16 connects manual valve 15 with solenoid controlled valve 17 which normally acts as the main water control valve for cabinet 1 and all accessories therein which are supplied with water. Valve 17 is operated by a solenoid indicated at 18 which may be energized by closing a circuit 19 by actuating a master switch control button 20 connected with a source of power 21. Master switch 20 preferably is conveniently accessibly located at unit 1 as illustrated in FIG. 1.

Water flowing through valve 17 when the valve is open then flows through conduit 22 to a manifold 23 mounted at 24 on partition 13. Manifold 23 may serve as the source of water supply for all accessories that may be housed in cabinet 1.

For the purposes of the improved filling apparatus, a conduit 26 runs from manifold 23 to a filter 27 and then to a pressure regulator 28 which may be adjusted to provide the desired water pressure at the drinking cup spout 9, say 40 pounds per square inch pressure. A cold water outlet line 29 is connected with and extends from pressure regulator 28 to a first junction tee 30 and connects by outlet line section 31 with a second junction tee 32 and then extends by line section 33 to a metering valve 34 accessibly located at cabinet 1, as indicated in FIG. 1. A branch line 35 extends from junction 30 to a water heater 36, and a hot water outlet line 37 connects the water heater 36 and second junction 32 whereby hot water may be delivered from heater 36 through outlet line 37 to the cold water outlet line 29-31-33.

Water in heater 36 may be heated by thermostatically controlled heating means 38 energized through lines 39 controlled by heater switch 40 connected with power line 21. Heater control switch 40 also may be located conveniently at cabinet 1, as shown in FIG. 1.

A solenoid operated cold water control valve 41 is located in outlet line section 31 between junctions 30 and 32 so as to control the flow of cold water from manifold 23 to the metering valve 34 and from metering valve 34 through outlet line section 42 to spout 9 where the water may be discharged into cup 2. Metering valve 34 may be adjusted to control the rate of flow of water through line 42 and thereby the rate at which water is discharged at the desired pressure into drinking cup 2.

The solenoid controlled valve 41 is actuated by cold water cup fill time delay switch means diagrammatically indicated at 43, also conveniently located at cabinet 1, as shown in FIG. 1 and connected to power line 21. The time delay switch means 43 for solenoid valve 41 operates when its button is actuated to hold the solenoid energizing circuit closed for a predetermined time interval and then automatically open the circuit. For example, the circuit may be closed for 13 seconds which holds valve 41 open for 13 seconds permitting cold water flow to the drinking cup during that time interval. This time interval, taken with the metered flow of water through metering valve 34, discharges just enough water through spout 9 to fill cup 2 to the desired level.

A solenoid operated hot water control valve 44 is provided in hot water outlet line 37 between water heater 36 and second junction 32. The solenoid of valve 44 may be actuated to open the valve by holding a control switch 45 depressed for the time interval during which hot water flow is desired. Switch 45 is connected in line 46 with power line 21.

The hot water control switch 45 may be located at a station spaced from cabinet 1, for example, on a movable dental tray readily accessible to the dentist so that the dentist can control the supply of hot water to drinking cup 2 when desired.

Thus, hot water may be discharged to the drinking cup at any time by the dentist by actuating control switch 45 and the hot water flows as long as the switch is held depressed. Alternately, if it is desired to fill the cup with warm water, the automatic cold water fill switch 43 is actuated and while cold water is flowing, the dentist may hold hot water switch 45 depressed to mix hot water with the cold water flowing and thereby temper or warm the cold water.

Normal operation or use of the improved cup filling apparatus in a dentist's office involves initially an adjustment of pressure regulator 28 to provide the desired pressure at the spout 9. The metering valve 34 also is adjusted to control the flow of water through cold water outlet pipe section 42 at a pressure adjusted so that the flow rate taken with the time setting of time delay switch means 43 delivers just enough water to cup 2 to fill the cup. Normally these adjustments, once made, need not be changed excepting when water supply pressure from the water main may change significantly.

The heater control switch 40 normally is turned "off" overnight or when the dentist or other personnel are not present in the office where the cabinet 1 is located. Also, switch 20 for the main solenoid valve 17 normally is "off" at the same time.

When the dentist or dental assistant is preparing the equipment for a patient, main water supply valve 17 is opened by actuating control switch 20 and water heater 36 is energized by actuating heater switch 40. Switch 43 is actuated to automatically fill a clean cup 2 that has been placed on cup support 3.

Cup 2 is within easy reach of the patient and when cup 2 is empty, it may be refilled by the patient, dentist, or dental assistant's actuation of button 43.

If the dentist desired the cold water to be warmed or tempered, the dentist or dental assistant will actuate and hold hot water switch 45 closed for the period of time during automatic cold water cup filling that delivers the desired amount of hot water into the cold water stream flowing to cup 2.

If the dentist desires the patient to use hot water, cup 2 may be filled with hot water by holding switch 45 depressed. Switch 45, as indicated, is located at a different station than cabinet 1 so as to be accessible only to the dentist or the dental assistant and not to the patient.

Electrical circuitry is illustrated diagrammatically in the drawing for the various switches, solenoid valves, and water heater. The parallel angular dot-dash lines in the various circuit lines merely indicate that the circuit lines are broken away to show greater length between the relative locations of the switches, actuated components, and power line.

The new drinking cup filling apparatus is very simple in construction and operation and utilizes standard components for the solenoid control valves, metering valve, pressure regulator, strainer, control switches, etc. These components do not require delicate adjustments and require little if any servicing. At the same time the improved apparatus enables normal automatic cold water cup filling by simple actuation of the cold water fill switch 43. Also the improved apparatus enables hot water to be introduced to temper the cold water during automatic filling when desired, or alternately permits hot water to be discharged to the cup in place of cold water. Accordingly, the improved construction achieves the objectives indicated and solves problems existing in the art.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described since the features of the invention may be applied to a construction for various uses. For example, rather than being used in a dentist's office as a part of dental equipment, the construction may be used in a doctor's office, or any other place where drinking cup filling with cold, or hot, or mixed hot and cold water is desired.

Having now described the features, discoveries and principles of the invention, the manner in which the improved construction is made, the characteristics of the new construction, and the advantageous, new and useful results obtained, the new and useful structures, devices, elements, arrangements, parts, combinations and subcombinations are set forth in the appended claims.

We claim:

1. Dental drinking cup filling apparatus for filling a cup or the like with a predetermined amount of water including a cold water supply, cup filler spout means, a cold water pipeline connecting the supply with the spout means; spaced first and second junctions in said pipeline between the supply and spout means; adjustable pressure regulating valve means located in said pipeline between the cold water supply and the first junction; solenoid operated cold water control valve means including a valve in the supply line between said junctions; a hot water branch line connected to each of and extending between said junctions, said branch line including heater means and solenoid operated hot water control valve means; the hot water control valve means including a valve located in the hot water branch line; a first control station, heater control means at said first station, and the cold water control valve means including a first actuating button located at said first station, and a time delay switch; said time delay switch holding the cold water solenoid valve open for a predetermined time interval after the time delay switch is actuated by the first actuating button; a second control station spaced from the first control station, the hot water control valve means including a second actuating button located at said second station; said second actuating button controlling the hot water branch line valve for supplying a flow of hot water from the hot water branch line to the spout means through the second junction independently of actuation of the cold water first actuating button and time delay switch; and metering valve means located in the pipeline between the second junction and the spout means for controlling the rate of flow of water discharged from the spout means including a manually adjustable control member located at said first station, said metering valve means together with the pressure regulating valve means and the time delay switch discharging the predetermined amount of water within the predetermined time interval determined by the time delay switch from the spout means to fill a cup located at the spout means, whereby the predetermined amount of water may be varied by varying either the time delay switch time interval, the setting of the pressure regulating valve means or the setting of the metering valve means.

* * * * *